United States Patent
Yamada et al.

(10) Patent No.: US 6,465,113 B2
(45) Date of Patent: Oct. 15, 2002

(54) ALUMINUM ALLOY BRAZING SHEET FOR A HEAT EXCHANGER

(75) Inventors: Noriyuki Yamada, Tokyo (JP); Takeyoshi Doko, Tokyo (JP); Yoshiaki Ogiwara, Tokyo (JP); Satoshi Tanaka, Tokyo (JP); Sunao Fukuda, Kariya (JP); Yoshihiko Kamiya, Kariya (JP); Masaki Shimizu, Kariya (JP); Kenji Negura, Kariya (JP)

(73) Assignees: The Furukawa Electric Company, Ltd., Tokyo (JP); Denso Corporation, Aichi (JP)

( * ) Notice: Subject to any disclaimer, the term of this patent is extended or adjusted under 35 U.S.C. 154(b) by 0 days.

(21) Appl. No.: 09/928,043

(22) Filed: Aug. 9, 2001

(65) Prior Publication Data

US 2002/0037426 A1 Mar. 28, 2002

(51) Int. Cl.$^7$ .............................. B32B 15/20
(52) U.S. Cl. .................... 428/654; 420/534; 420/535; 420/537; 420/538; 428/607; 428/636; 428/923; 428/924; 428/925; 428/933
(58) Field of Search .................. 428/654, 636, 428/607, 923, 924, 925, 933; 420/534, 535, 537, 538

(56) References Cited

U.S. PATENT DOCUMENTS 6,019,939 A * 2/2000 Gray et al. ............... 420/535

* cited by examiner

Primary Examiner—Robert R. Koehler
(74) Attorney, Agent, or Firm—Knobbe Martens Olson & Bear LLP (57) ABSTRACT

An aluminum alloy brazing sheet having a four-layered structure, of sheet thickness 0.2 mm or less, and having a core alloy, a filler alloy of an Al—Si alloy on one surface of the core alloy, a sacrificial anode material of an Al—Zn alloy on the other surface of the core alloy, and an intermediate layer between the core alloy and sacrificial anode material, wherein the core alloy is composed of an Al alloy containing given amounts of Si, Fe, Mn, and Cu, with the balance being made of Al and unavoidable impurities, and wherein the intermediate layer is composed of an Al alloy containing given amounts of Si, Fe, Mn, and Cu, with the balance being made of Al and unavoidable impurities.

16 Claims, 3 Drawing Sheets

Fig. 6

ALUMINUM ALLOY BRAZING SHEET FOR A HEAT EXCHANGER

FIELD

The present invention relates to an aluminum alloy brazing sheet for use, for example, in heat exchangers of automobiles.

BACKGROUND

Figure 1:
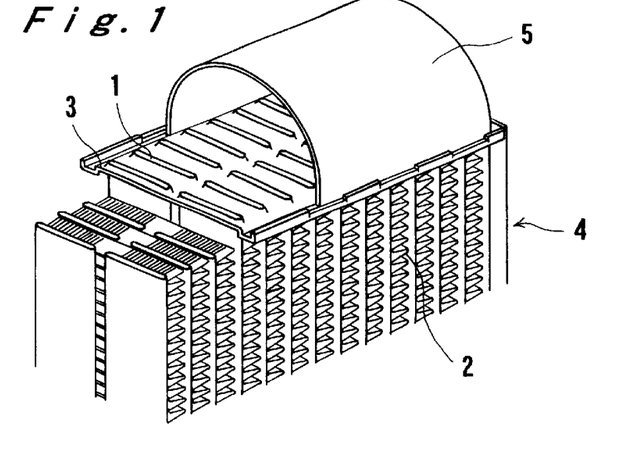
FIG. 1 is a partially cut-off perspective view of an automotive heat exchanger (radiator)

For example, a conventional radiator of a heat exchanger for use in automobiles has a structure as shown in FIG. 1. The radiator is manufactured by the steps comprising disposing corrugated fins 2 among tubes 1, through which a refrigerant flows; assembling a core 4, by attaching header plates 3 at both ends of the tubes 1, and, after brazing the assembled body, attaching a resin tank 5 to the header plate 3. The refrigerant is cooled by flowing it through the tubes 1 of a radiator having the construction described above.

Side surfaces of the core 4 are reinforced with side plates (not shown).

A thin sheet, of thickness about 0.1 mm, made of an alloy manufactured by adding about 1.5 wt % of Zn in an alloy prescribed in JIS-3003, is used for the fin.

The JIS-3003 alloy is used as a core alloy of an aluminum alloy brazing sheet, of thickness 0.2 to 0.4 mm, and a filler alloy is clad on one surface of the core alloy and a JIS-7072 alloy is clad on the other surface of the core alloy, as a sacrificial anode material, to prevent corrosion pits from occurring. This brazing sheet is seam-welded to form a cylinder with the sacrificial anode material inside (at the refrigerant side), or it is rolled into a cylinder with the sacrificial anode material inside (at the refrigerant side), and the cylindrical brazing sheet is brazed to the tube.

An aluminum alloy brazing sheet, of thickness 1.0 to 2.0 mm, made of the same materials used in the tube, is also used for the header plate 3. While the heat exchanger is required to be lightweight in recent years, corrosion resistance of heat exchanger members should be more improved when the members are made of thin sheet materials to reduce the weight of the heat exchanger.

Usually, corrosion resistance of the tube can be attained by making the electric potential of the surface of the clad material less noble than the electric potential of the core alloy, by using the sacrificial anode material clad on the inside of the tube (the refrigerant side), and by making the electric potential of the fin material integrated by brazing at the outside (the atmosphere side) of the tube, less noble than the electric potential of the tube material.

Figure 2:
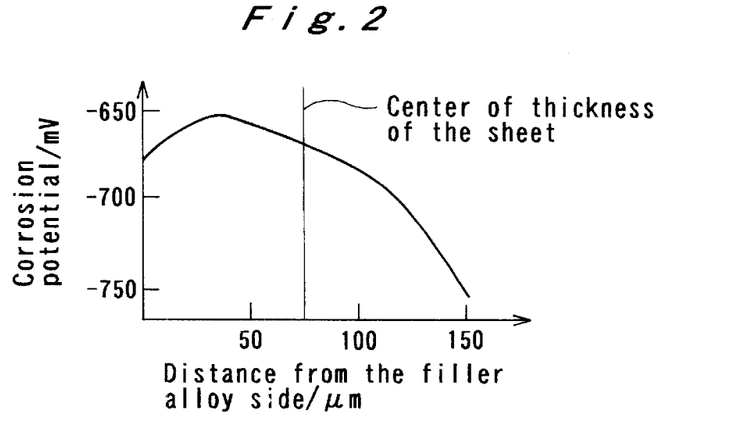
FIG. 2 is a graph showing a corrosion potential in the direction of thickness of sheet after heating for brazing in a conventional product.

However, by brazing, Cu added in the core alloy diffuses into the sacrificial anode material and filler alloy, and Zn added in the sacrificial anode material diffuses into the core alloy, in the conventional three-layered material. Particularly, when the thickness of the sheet is about 0.2 mm or less, Cu and Zn may diffuse across the total thickness of the sheet, by heating at about 600° C., for the conventional brazing process, and thereby the potential difference in the direction of the thickness of the sheet is reduced, resulting in insufficient corrosion-resistance ability. When the amount of Zn to be added in the sacrificial anode material is greatly increased, to ensure a sufficient potential difference in the direction of the thickness of the sheet after heating for brazing, the electric potential at the sacrificial anode material side of the core alloy becomes less noble due to the diffusion of Zn. As a result, the electric potential (corrosion potential) distribution in the direction of the thickness of the sheet has a peak in which the electric potential at the outer side (the atmosphere side) is noble as compared with that at the center of the sheet in thickness (see FIG. 2).

Once corrosion pits are occurred at the inside of the tube (at the refrigerant side), they spread over the surface and advance in the direction of depth. However, portions less noble in electric potential prevent portions noble in electric potential from being corroded in the brazing sheet. Consequently, when the noblest portion having the highest electric potential (the peak position) within the brazing sheet, is located at the outside (at the atmosphere side) from the center of the thickness of the sheet, the electric potential gradient from the sacrificial anode material to the peak position is so reduced that the corrosion-resistance ability is insufficient. The distance to the peak position becomes small at the outside (at the atmosphere side) of the tube, to reduce the portions that serve as a sacrificial corrosion resistive layer. When the corrosion pits advance beyond the electric potential peak position in the direction of the thickness of the sheet, advance of corrosion is accelerated, to cause penetration holes, since the tip of the corrosion pit is less noble in electric potential than the surrounding portions of the pit.

SUMMARY

The present invention is an aluminum alloy brazing sheet that has a four-layered structure, of sheet thickness 0.2 mm or less, and that comprises a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, and 0.05 to 0.5 wt % of Cu, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, and 0.4 to 1 wt % of Cu, with the balance being made of Al and unavoidable impurities.

Further, the present invention is an aluminum alloy brazing sheet that has a four-layered structure, of sheet thickness 0.2 mm or less, and that comprises a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, and 0.05 to 0.5 wt % of Cu, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, 0.4 to 1 wt % of Cu, and 0.2 to 1.5 wt % of Mg, with the balance being made of Al and unavoidable impurities.

Still further, the present invention is an aluminum alloy brazing sheet that has a four-layered structure, of sheet thickness 0.2 mm or less, and that comprises a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, 0.05 to 0.5 wt % of Cu, and 0.05 to 0.2 wt % of Mg, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, 0.4 to 1 wt % of Cu, and 0.2 to 1.5 wt % of Mg, with the balance being made of Al and unavoidable impurities.

Other and further features, and advantages of the invention will appear more fully from the following description, take in connection with the accompanying drawings.

DETAILED DESCRIPTION

The inventors of the present invention have studied intensively for solving the difficulties with respect to corrosion resistance of the above-described conventional three-layered brazing sheet. As a result, we found that progress of corrosion pits can be suppressed by providing a specific intermediate layer between a core alloy and a sacrificial anode material, so that the portion noblest in electric potential is located at the inner side (the refrigerant side) from the center in the direction of the thickness of the sheet even after alloy elements added in the core alloy and sacrificial anode material after heating for brazing have been diffused. The present invention has been attained based on the above finding.

According to the present invention, there are provided the following means of (1) to (6). Herein, the means (1) to (6) are referred to as the first to sixth inventions, respectively, which are collectively referred to as the present invention.

(1) An aluminum alloy brazing sheet having a four-layered structure, of sheet thickness 0.2 mm or less, and comprising a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, and 0.05 to 0.5 wt % of Cu, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, and 0.4 to 1 wt % of Cu. with the balance being made of Al and unavoidable impurities.

(2) An aluminum alloy brazing sheet having a four-layered structure, of sheet thickness 0.2 mm or less, and comprising a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, and 0.05 to 0.5 wt % of Cu, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, 0.4 to 1 wt % of Cu, and 0.2 to 1.5 wt % of Mg, with the balance being made of Al and unavoidable impurities.

(3) An aluminum alloy brazing sheet having a four-layered structure, of sheet thickness 0.2 mm or less, and comprising a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, 0.05 to 0.5 wt % of Cu, and 0.05 to 0.2 wt % of Mg, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, 0.4 to 1 wt % of Cu, and 0.2 to 1.5 wt % of Mg, with the balance being made of Al and unavoidable impurities.

(4) The aluminum alloy brazing sheet according to any one of the above (1) to (3), wherein either the core alloy or the intermediate layer, or both of them, comprises at least one of Cr, Zr and Ti each in an amount of 0.3 wt % or less.

(5) The aluminum alloy brazing sheet according to any one of the above (1) to (4), wherein the ratio of thickness of the core alloy and the intermediate layer is in the range of $1 \leq$ the core alloy/the intermediate layer 23 3.

(6) The aluminum alloy brazing sheet according to any one of the above (1) to (5), wherein the sacrificial anode material is composed of the Al—Zn alloy comprising 2 to 6 wt % of Zn, with the balance being made of Al and unavoidable impurities.

In the present invention, the intermediate layer is provided between the core alloy and the sacrificial anode material, and a material containing a large amount of Cu and being noble in electric potential is used in the intermediate layer. Consequently, the portion being the noblest in electric potential is located at the sacrificial anode material side in the direction of the thickness of the sheet, even after Cu in the core alloy and intermediate layer and Zn in the sacrificial anode material layer have been diffused by heating for brazing. As a result, corrosion resistance is improved by making the electric potential gradient in the direction of thickness of the sheet to be larger at the inner side (the refrigerant side), and making the volume of the portion (layer) that serves as a sacrificial corrosion resistant layer to be larger at the outer side (the atmosphere side).

The significance for adding elements and the reason for limiting their compositions with respect to the alloy components of the aluminum alloy brazing sheet of the present invention will be described below.

The elements in the core alloy to be used in the present invention will be described.

Si contributes for improving the mechanical strength of the alloy by forming a solid solution in the matrix after brazing. The content of Si is restricted within the range of 0.1 to 0.5 wt %, because the effect of adding Si is insufficient when the content is less than 0.1 wt %, while, when the content exceeds 0.5 wt %, simple substance Si is precipitated to lower self corrosion resistance of the core alloy. The Si content is preferably in the range of 0.2 to 0.4 wt %.

Fe serves for permitting giant intermetallic compounds to distribute throughout the alloy, makes crystal grains of the core alloy fine, and prevents the alloy from being cracked during forming. The content of Fe is restricted within the range of 0.2 to 0.8 wt %, because the effect of adding Fe is insufficient when the content is less than 0.2 wt %, while, when the content exceeds 0.8 wt %, self corrosion resistance of the core alloy is lowered. The content of Fe is preferably in the range of 0.3 to 0.6 wt %.

Cu contributes for controlling the electric potential in the direction of thickness (depth) of the sheet and for improving the mechanical strength of the sheet. Increasing the content of Cu makes the electric potential of the resultant alloy noble, and it improves the mechanical strength. The content of Cu is restricted within the range of 0.05 wt % to 0.5 wt %, because the effect for improving the mechanical strength is insufficient when the content is less than 0.05 wt %. On the other hand, when the content of Cu exceeds 0.5 wt %, the electric potential difference between the core alloy and intermediate layer is reduced after the element(s) has been diffused by brazing, to fail in expecting improvement of corrosion resistance. The content of Cu is preferably in the range of 0.1 to 0.3 wt %. The content of Cu in the core alloy is preferably adjusted to be 80% or less relative to the Cu content in the intermediate layer as will be described hereinafter.

Mn permits fine intermetallic compounds to be distributed in the alloy, and serves for improving the mechanical strength without decreasing corrosion resistance. The content of Mn is restricted within the range of 0.5 to 2.0 wt %, because the effect of adding Mn is insufficient when the content is less than 0.5 wt %, while, when the content exceeds 2.0 wt %, processing ability is deteriorated as well as the production yield of the core alloy is decreased. The content of Mn is preferably in the range of 0.5 to 1.5 wt %.

Mg as a selective element that may be contained in the core alloy contributes, together with Si, for improving the mechanical strength by aging precipitation of a compound $Mg_2Si$. The content of Mg is restricted within the range of 0.2 wt % or less, because brazing ability decreases by allowing Mg to diffuse in the filler alloy and to react with the flux with the Mg content of more than 0.2 wt % when the filler alloy is provided on one surface of the core alloy for brazing. The content of Mg when the core alloy contains Mg is preferably adjusted to be smaller than the content of Mg contained in the intermediate layer as the selective element as will be described hereinafter.

Each of Cr, Zr or Ti as a selective element that may be contained in the core alloy contributes for improving the mechanical strength as well as corrosion resistance of the core alloy by forming fine intermetallic compounds. The content of each of Cr, Zr and Ti is restricted within the range of 0.3 wt % or less, preferably 0.03 to 0.3 wt %, because the effects of adding these elements are insufficient at each too small content, while, when the content exceeds 0.3 wt %, cracks may be occurred during the casting process. The content of each element of Cr, Zn and Ti is preferably in the range of 0.08 to 0.2 wt %.

While the elements in the core alloy to be used in the present invention have been described above, boron (B) that can be added for making the casting structure fine and other unavoidable impurity elements may be contained within the range of 0.05 wt % or less, respectively.

The elements in the alloy for the intermediate layer to be used in the present invention will be described hereinafter.

Si contributes for improving mechanical strength by forming a solid solution in the matrix after brazing. The content of Si is restricted within the range of 0.1 to 0.5 wt %, because, when the content is less than 0.1%, the effect of adding Si is insufficient, while, when the content exceeds 0.5 wt %, simple substance Si is precipitated to decrease self corrosion resistance of the intermediate layer. The content of Si is preferably in the range of 0.2 to 0.4 wt %.

Fe permits giant intermetallic compounds to be distributed in the alloy, makes the crystal grain size in the intermediate layer fine, and serves for preventing cracks from occurring during the forming process.

The content of Fe is restricted within the range of 0.2 to 0.8 wt %, because, when the content is less than 0.2 wt %, the effect of adding Fe is insufficient, while, when the content exceeds 0.8 wt %, self corrosion resistance of the intermediate layer decreases. The content of Fe is preferably in the range of 0.3 to 0.6 wt %.

Cu contributes for adjusting electric potential in the direction of thickness of the sheet and for improving mechanical strength. The content of Cu is restricted within the range of 0.4 to 1.0 wt %. When the content is less than 0.4 wt %, an electric potential difference between the intermediate layer and the core alloy cannot be secured after diffusion of the elements by brazing, to fail in expecting improvement of corrosion resistance. On the other hand, when the content exceeds 1.0 wt %, the elements are diffused into the sacrificial anode material by brazing, to decrease corrosion resistance at the side of the refrigerant. The content of Cu is preferably in the range of 0.6 to 0.8 wt %.

Mn permits fine intermetallic compounds to distribute in the alloy, and improves the mechanical strength without decreasing corrosion resistance. The content of Mn is restricted within the range of 0.5 to 2.0 wt %, because the effect of adding Mn is insufficient when the content is less than 0.5 wt %, while, when the content exceeds 2.0 wt %, machinability in the manufacturing process becomes poor and the production yield decreases. The content of Mn is preferably in the range of 0.5 to 1.5 wt %.

The selective element Mg that can be contained in the intermediate layer contributes, together with Si, for improving the mechanical strength by aging precipitation of a compound $Mg_2Si$. The content of Mg is restricted within the range of 0.2 to 1.5 wt %, because the effect of adding Mg is insufficient when the content is less than 0.2 wt %. On the other hand, when the content of Mg exceeds 1.5 wt %, Mg is diffused to the surface of the sacrificial anode material by brazing. As a result, brazing ability decreases by a reaction of Mg with the flux when the tube is formed by brazing, or the intermediate layer melts by brazing.

Cr, Zr and Ti as selective elements (arbitrary elements) that can be contained in the intermediate layer contribute to improve the mechanical strength and corrosion resistance of the alloy by forming fine intermetallic compounds. The content of each of Cr, Zr and Ti is restricted within the range of 0.3 wt % or less, preferably 0.03 to 0.3 wt %, because the effect of adding each of them is insufficient when the content is too small, while, when the content exceeds 0.3 wt %, cracks may be occurred during the casting process. The content of each of the elements Cr, Zr and Ti is preferably in the range of 0.08 to 0.2 wt %.

While the elements of the alloy to be used in the intermediate layer according to the present invention have been described above, boron (B) that is added for making the casting structure fine and other unavoidable impurities may be contained in an amount of 0.05 wt % or less, respectively.

The elements in the alloy for the sacrificial anode material to be used in the present invention will be described hereinafter.

An Al—Zn alloy that is known itself in the art can be used as the sacrificial anode material. The Al—Zn alloy has an effect for preventing corrosion pits from spreading over the core alloy when the corrosion pits are occurred in said sacrificial anode material under the environment for using the heat exchanger.

Zn is an essential element for making the electric potential of the sacrificial anode material to be less noble than the core alloy, to ensure corrosion resistance effect. The preferable amount of addition of Zn is 2 wt % or more and 6 wt % or less. The effect of adding Zn is insufficient when the amount is too small. On the other hand, the effect of adding Zn is saturated at an amount exceeding 6.0 wt %, while decreasing the melting point of the alloy to possibly cause melting of the alloy by heating in the brazing process. A content of 0.05 wt % or less of each impurity element may be contained as unavoidable impurities in Al (Al alloy) of the sacrificial anode material.

The construction of the aluminum alloy brazing sheet of the present invention will be described hereinafter.

In the aluminum alloy brazing sheet of the present invention, the aluminum alloy having the composition as described above is used as the core alloy, the intermediate layer with the composition as described above is disposed on one surface of the core alloy and the sacrificial anode material is clad on the intermediate layer, and, if necessary, the aluminum alloy filler alloy is further provided on the other surface of the core alloy.

A preferable embodiment of the practical construction of the aluminum alloy brazing sheet will be described hereinafter.

The clad ratio of each of the filler alloy and sacrificial anode material is 5 to 25% to the thickness of the sheet. The ratio between the thickness of the core alloy and the thickness of the intermediate layer is preferably in the range of $1 \leq$ the core alloy/the intermediate layer $\leq 3$. When the ratio (core alloy/intermediate layer) is less than 1, the portion noblest in electric potential in the direction of thickness of the sheet shifts toward the filler alloy side (the atmosphere side) by diffusion of the elements after brazing, thereby failing in obtaining sufficient corrosion resistance in some cases. When the ratio (core alloy/intermediate layer) is more than 3, on the other hand, the proportion of the intermediate layer becomes too small so that a sufficient effect for controlling the electric potential gradient in the thickness of the sheet may not be obtained.

The aluminum alloy brazing sheet of the present invention may be thicker than 0.2 mm, if necessary, but the effect of the brazing sheet is remarkable when the sheet thickness is 0.2 mm or less. The lower limit of the thickness of the sheet is not particularly restricted, but it is preferably 0.12 mm or more.

As the filler alloy, use can be made of, for example, Al—Si alloys prescribed in JIS-4343, JIS-4045 and JIS-4004, by forming a clad layer by rolling and compression-welding of the alloy, or by surface-coating of a powder of such a filler alloy using a binder and the like.

The aluminum alloy brazing sheet of the present invention can be used, for example, as tube materials and header plate materials of a heat exchanger.

When the aluminum alloy brazing sheet of the present invention is used in a form of tube, examples of the favorable method for forming a tube include seam-welding of the sheet into a tube, or brazing to form a tube after bending the sheet.

The aluminum alloy brazing sheet of the present invention has excellent corrosion resistance even when the sheet is thin and even after diffusion of the elements over the entire thickness of the sheet by heating for brazing.

In particular, the aluminum alloy brazing sheet of the present invention can be advantageously used as a thin radiator tube material, and it can prevent corrosion resistance from lowering due to diffusion of Cu from the core alloy to the filler alloy and diffusion of Zn from the sacrificial anode material to the core alloy.

The aluminum alloy brazing sheet for use in a heat exchanger of the present invention is excellent for applying to rolling, excellent in brazability, as well as excellent in corrosion resistance as a thin sheet for a heat exchanger material. Accordingly, the aluminum alloy brazing sheet of the invention is preferable as a material of tubes for forming refrigerant passageways of heat exchangers, with favorable industrial applicability.

The present invention will be described in more detail with reference to the following examples, but the invention is not limited to those.

EXAMPLE

The core alloy and the intermediate-layer alloy having each composition as shown in Table 1, and JIS-3003 alloy were cast with mold, and both surfaces of each cast-molded body was scalpet to finish the core alloy, the intermediate layer alloy, and the JIS-3003 alloy with a thickness of 15 mm, 8 mm, and 23 mm, respectively. JIS-4045 alloy was used as the filler alloy, and the alloys having each composition as listed in Table 1 were cast into the sacrificial anode materials by the same manner as manufacturing the core alloy. The filler alloy and the sacrificial anode material were finished to have a thickness of 8 mm and 9 mm, respectively, by hot-rolling after scalping. Four layers of the filler alloy, core alloy, intermediate layer and sacrificial anode material were laminated in this order, and were hot-rolled at 520° C. to form a four-layered clad material. The clad material was processed to have a thickness of 0.25 mm by cold-rolling, followed by cold-rolling to a final thickness of 0.15 mm after intermediate annealing, to manufacture a H14 test specimen.

The core alloy and intermediate layer were also finished to have a thickness of 10 mm and 13 mm, respectively, and were formed into H14 test specimens in the same manner as above.

A thin sheet composed of an Al-0.5 wt % Si-1.0 wt % Mn-2.0 wt % Zn alloy of thickness 0.07 mm was machined into a corrugated sheet, to use as the fin.

Corrosion resistance, corrosion potential and brazing ability of each of the thus-prepared samples were determined by the following methods.

Corrosion Resistance

Atmosphere side: The above core after heating for brazing was used and subjected to the CASS test for 360 hours by masking the sacrificial anode material side. The fin material of the test sample was cut off, and the pitting depth formed at the portion on which the filler alloy was exposed was measured. The pitting depth was measured by the focus depth method using an optical microscope.

Refrigerant side: The sample core after heating for brazing in the above conditions was used in the CASS test for 360 hours by masking the filler alloy side and end faces. An ASTM artificial water (Cl$^-$, 100 ppm; SO$_4^{2-}$, 100 ppm;

$CO_3^{2-}$, 100 ppm) was used as a corrosive solution, and the maximum pitting depth of the corrosion pit was measured after a 6-month's immersion test with a cycle of 88° C. for 8 hours and room temperature for 16 hours. The pitting depth was measured by the focus depth method using an optical microscope.

Corrosion Potential in the Direction of the Thickness of the Sheet

Figure 3:
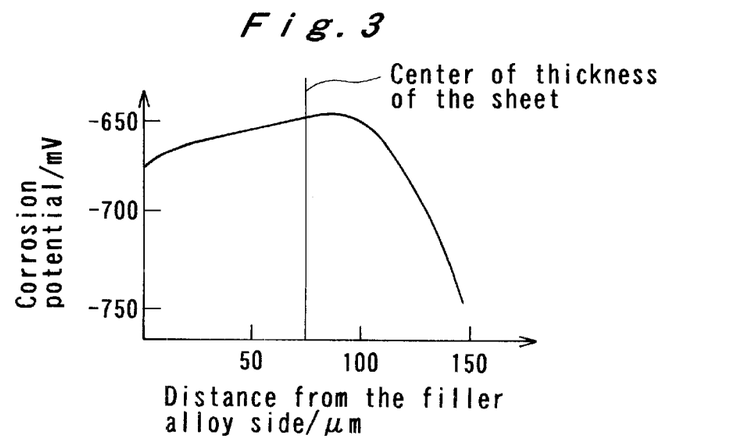
FIG. 3 is a graph showing a corrosion potential in the direction of thickness of sheet after heating for brazing in an example according to the present invention.

Each sample after heating for brazing as described above was etched in the direction of thickness of the sheet, and corrosion potential was measured at several points. The corrosion potential of the No. 2 sample in Table 2 in the direction of thickness of the sheet is shown in FIG. 3. An electrolyte solution of an aqueous 5% NaCl solution, and an Ag/AgCl electrode were used for the measurement.

Brazing Ability

Figure 4:
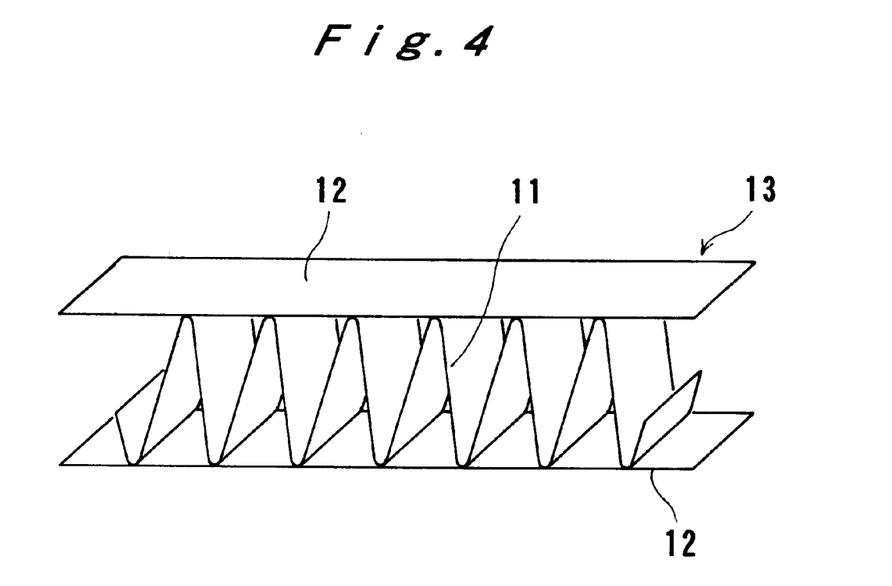
FIG. 4 is a perspective view of a core for evaluation of corrosion resistance at the outside (atmosphere side)
Figure 5:
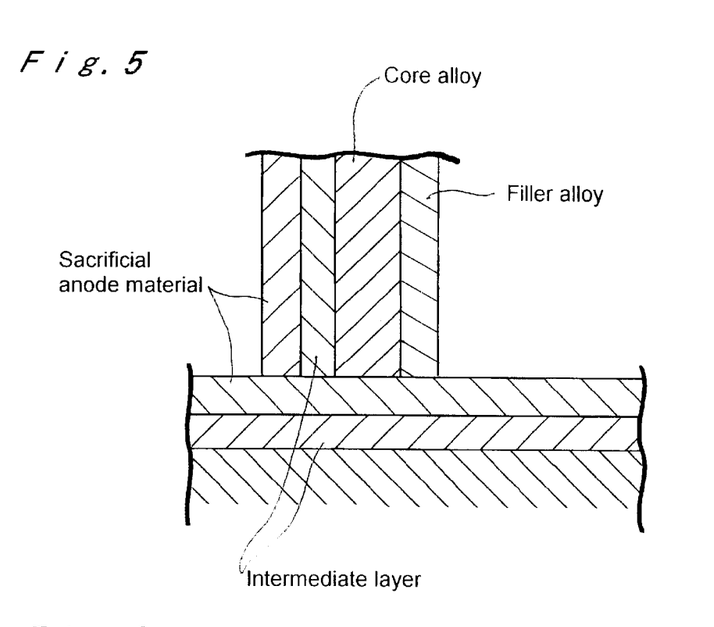
FIG. 5 is a sectional view of a core for evaluation of brazing ability, before brazing.
Figure 6:
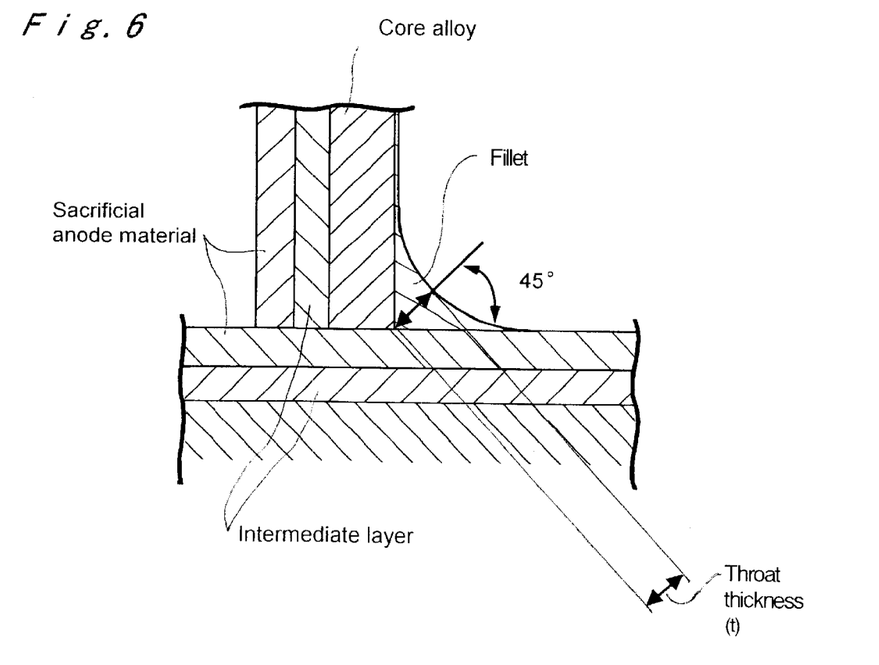
FIG. 6 is a sectional view of the core for evaluation of brazing ability, after brazing, with a fillet formed by brazing and a throat thickness (t) of said filet.

The corrugated fin material 11 and the sample 12 were combined as shown in FIG. 4 to form a core 13. The core was coated with a flux by immersing it in a 5% suspension solution of the flux. After drying at 200° C., the core was heated at 600° C. for 3 minutes in an inert gas for brazing, followed by determining the successful welding ratio of the fin. Alternatively, the sample materials were combined as shown in FIG. 5, and the assembly was heated for brazing by the same process as in the brazing of the core, to determine a throat thickness of the resultantly-formed fillet (fillet weld at the corner, the thickness as represented by t (mm) in FIG. 6).

The construction of the brazing sheet and the results of measurements are shown in Table 2.

TABLE 1

| | Alloy composition/wt % | | | | | | | | | | Thickness of |
|---|---|---|---|---|---|---|---|---|---|---|---|
| | Si | Fe | Cu | Mn | Mg | Cr | Zr | Ti | Zn | Al | combined sheet/mm |
| Example of this invention Core alloy | | | | | | | | | | | |
| A1 | 0.15 | 0.5 | 0.3 | 1.1 | | | | | | Balance | 15 |
| A2 | 0.3 | 0.5 | 0.3 | 1.1 | | | | | | Balance | 15 |
| A3 | 0.4 | 0.5 | 0.3 | 1.1 | | | | | | Balance | 15 |
| A4 | 0.3 | 0.3 | 0.3 | 1.1 | | | | | | Balance | 15 |
| A5 | 0.3 | 0.7 | 0.3 | 1.1 | | | | | | Balance | 15 |
| A6 | 0.3 | 0.5 | 0.1 | 1.1 | | | | | | Balance | 15 |
| A7 | 0.3 | 0.5 | 0.5 | 1.1 | | | | | | Balance | 15 |
| A8 | 0.3 | 0.5 | 0.3 | 0.6 | | | | | | Balance | 15 |
| A9 | 0.3 | 0.5 | 0.3 | 1.6 | | | | | | Balance | 15 |
| A10 | 0.3 | 0.5 | 0.3 | 1.1 | 0.1 | | | | | Balance | 15 |
| A11 | 0.3 | 0.5 | 0.3 | 1.1 | | 0.15 | | | | Balance | 15 |
| A12 | 0.3 | 0.5 | 0.3 | 1.1 | | | 0.15 | | | Balance | 15 |
| A13 | 0.3 | 0.5 | 0.3 | 1.1 | | | | 0.15 | | Balance | 15 |
| A14 | 0.3 | 0.5 | 0.3 | 1.1 | | 0.08 | 0.08 | 0.08 | | Balance | 15 |
| A15 | 0.3 | 0.5 | 0.3 | 1.1 | 0.1 | 0.15 | | | | Balance | 15 |
| A16 | 0.3 | 0.5 | 0.3 | 1.1 | 0.1 | | 0.15 | | | Balance | 15 |
| A17 | 0.3 | 0.5 | 0.3 | 1.1 | 0.1 | | | 0.15 | | Balance | 15 |
| Comparative example Core alloy | | | | | | | | | | | |
| A18 | 0.8 | 0.5 | 0.3 | 1.1 | | | | | | Balance | 15 |
| A19 | 0.3 | 1 | 0.3 | 1.1 | | | | | | Balance | 15 |
| A20 | 0.3 | 0.5 | 0.6 | 1.1 | | | | | | Balance | 15 |
| A21 | 0.3 | 0.5 | 0.3 | 2.1 | | | | | | Balance | 15 |
| A22 | 0.3 | 0.5 | 0.3 | 2.1 | | | | | | Balance | 15 |
| A23 | 0.3 | 0.5 | 0.3 | 1.1 | | | | | | Balance | 10 |
| A24 | 0.3 | 0.5 | 0.3 | 1.1 | | | | | | Balance | 19 |
| Example of this invention Intermediate layer | | | | | | | | | | | |
| B1 | 0.15 | 0.5 | 0.7 | 1.1 | | | | | | Balance | 8 |
| B2 | 0.3 | 0.5 | 0.7 | 1.1 | | | | | | Balance | 8 |
| B3 | 0.4 | 0.5 | 0.7 | 1.1 | | | | | | Balance | 8 |
| B4 | 0.3 | 0.3 | 0.7 | 1.1 | | | | | | Balance | 8 |
| B5 | 0.3 | 0.7 | 0.7 | 1.1 | | | | | | Balance | 8 |
| B6 | 0.3 | 0.5 | 0.5 | 1.1 | | | | | | Balance | 8 |
| B7 | 0.3 | 0.5 | 0.9 | 1.1 | | | | | | Balance | 8 |
| B8 | 0.3 | 0.5 | 0.7 | 0.6 | | | | | | Balance | 8 |
| B9 | 0.3 | 0.5 | 0.7 | 1.6 | | | | | | Balance | 8 |
| B10 | 0.3 | 0.5 | 0.7 | 1.1 | 0.6 | | | | | Balance | 8 |
| B11 | 0.3 | 0.5 | 0.7 | 1.1 | | 0.15 | | | | Balance | 8 |
| B12 | 0.3 | 0.5 | 0.7 | 1.1 | | | 0.15 | | | Balance | 8 |
| B13 | 0.3 | 0.5 | 0.7 | 1.1 | | | | 0.15 | | Balance | 8 |
| B14 | 0.3 | 0.5 | 0.7 | 1.1 | | 0.08 | 0.08 | 0.08 | | Balance | 8 |
| B15 | 0.3 | 0.5 | 0.7 | 1.1 | 0.6 | 0.15 | | | | Balance | 8 |
| B16 | 0.3 | 0.5 | 0.7 | 1.1 | 0.6 | | 0.15 | | | Balance | 8 |
| B17 | 0.3 | 0.5 | 0.7 | 1.1 | 0.6 | | | 0.15 | | Balance | 8 |

TABLE 1-continued

| | Alloy composition/wt % | | | | | | | | | Thickness of |
|---|---|---|---|---|---|---|---|---|---|---|
| | Si | Fe | Cu | Mn | Mg | Cr | Zr | Ti | Zn | Al | combined sheet/mm |
| Comparative example intermediate layer | | | | | | | | | | | |
| B18 | 0.8 | 0.5 | 0.7 | 1.1 | | | | | | Balance | 8 |
| B19 | 0.3 | 1 | 0.7 | 1.1 | | | | | | Balance | 8 |
| B20 | 0.3 | 0.5 | 1.2 | 1.1 | | | | | | Balance | 8 |
| B21 | 0.3 | 0.5 | 0.7 | 2.1 | | | | | | Balance | 8 |
| B22 | 0.3 | 0.5 | 0.7 | 1.1 | 1.6 | | | | | Balance | 8 |
| B23 | 0.3 | 0.5 | 0.7 | 1.1 | | | | | | Balance | 13 |
| B24 | 0.3 | 0.5 | 0.7 | 1.1 | | | | | | Balance | 4 |
| Sacrificial anode material | | | | | | | | | | | |
| Example of this invention C1 | | | | | | | | | 4 | Balance | 8 |
| Comparative example C2 | | | | | | | | | 1 | Balance | 8 |

TABLE 2

| No. | Core alloy | Intermediate layer | Sacrificial anode material | Maximum pitting depth/μm Atmosphere side | Maximum pitting depth/μm Refrigerant side | Position to be noblest in direction of sheet thickness | Brazing Rate of successive welding/% | Brazing Throat thickness/mm |
|---|---|---|---|---|---|---|---|---|
| Example of this invention | | | | | | | | |
| 1 | A1 | B2 | C1 | 54 | 48 | ○ | 100 | 2.4 |
| 2 | A2 | B1 | C1 | 52 | 50 | ○ | 98 | 2.5 |
| 3 | A2 | B2 | C1 | 58 | 53 | ○ | 99 | 2.4 |
| 4 | A2 | B3 | C1 | 56 | 52 | ○ | 100 | 2.6 |
| 5 | A2 | B4 | C1 | 56 | 55 | ○ | 100 | 2.6 |
| 6 | A2 | B5 | C1 | 60 | 47 | ○ | 98 | 2.5 |
| 7 | A2 | B6 | C1 | 67 | 58 | ○ | 100 | 2.5 |
| 8 | A2 | B7 | C1 | 42 | 43 | ○ | 99 | 2.4 |
| 9 | A2 | B8 | C1 | 51 | 50 | ○ | 100 | 2.6 |
| 10 | A2 | B9 | C1 | 53 | 51 | ○ | 100 | 2.7 |
| 11 | A2 | B10 | C1 | 54 | 53 | ○ | 97 | 2.5 |
| 12 | A2 | B13 | C1 | 58 | 52 | ○ | 100 | 2.3 |
| 13 | A2 | B17 | C1 | 52 | 58 | ○ | 96 | 2.7 |
| 14 | A3 | B2 | C1 | 59 | 49 | ○ | 98 | 2.4 |
| 15 | A4 | B2 | C1 | 55 | 47 | ○ | 100 | 2.4 |
| 16 | A5 | B2 | C1 | 50 | 53 | ○ | 97 | 2.3 |
| 17 | A6 | B2 | C1 | 46 | 41 | ○ | 96 | 2.4 |
| 18 | A7 | B2 | C1 | 69 | 60 | ○ | 100 | 2.5 |
| 19 | A8 | B2 | C1 | 58 | 55 | ○ | 99 | 2.6 |
| 20 | A9 | B2 | C1 | 60 | 57 | ○ | 100 | 2.6 |
| 21 | A10 | B10 | C1 | 56 | 55 | ○ | 99 | 2.3 |
| 22 | A10 | B17 | C1 | 54 | 52 | ○ | 96 | 2.7 |
| 23 | A11 | B2 | C1 | 51 | 46 | ○ | 98 | 2.4 |
| 24 | A12 | B2 | C1 | 53 | 48 | ○ | 100 | 2.6 |
| 25 | A13 | B2 | C1 | 50 | 45 | ○ | 100 | 2.5 |
| 26 | A13 | B10 | C1 | 52 | 46 | ○ | 95 | 2.3 |
| 27 | A13 | B11 | C1 | 50 | 47 | ○ | 100 | 2.5 |
| 28 | A13 | B12 | C1 | 54 | 43 | ○ | 98 | 2.4 |
| 29 | A13 | B13 | C1 | 51 | 45 | ○ | 100 | 2.6 |
| 30 | A13 | B17 | C1 | 53 | 55 | ○ | 96 | 2.7 |
| 31 | A14 | B14 | C1 | 52 | 41 | ○ | 97 | 2.5 |
| 32 | A17 | B10 | C1 | 56 | 58 | ○ | 100 | 2.3 |
| 33 | A17 | B17 | C1 | 58 | 55 | ○ | 96 | 2.5 |

TABLE 2-continued

| | | | | Maximum pitting depth/μm | | Position to be noblest in direction of sheet thickness | Brazing | |
|---|---|---|---|---|---|---|---|---|
| No. | Core alloy | Intermediate layer | Sacrificial anode material | Atmosphere side | Refrigerant side | | Rate of successive welding/% | Throat thickness/mm |
| Comparative example | | | | | | | | |
| 34 | A2 | B18 | C1 | 65 | Penetration | ○ | 100 | 2.5 |
| 35 | A2 | B19 | C1 | 62 | Penetration | ○ | 100 | 2.6 |
| 36 | A2 | B20 | C1 | The intermediate layer melted during brazing process | | — | — | — |
| 37 | A2 | B21 | C1 | Clad could not be formed due to occurrence of cracks | | — | — | — |
| 38 | A2 | B22 | C1 | Penetration | 60 | ○ | 67 | 1.3 |
| 39 | A18 | B2 | C1 | Penetration | 55 | ○ | 100 | 2.5 |
| 40 | A19 | B2 | C1 | Penetration | penetration | ○ | 98 | 2.5 |
| 41 | A20 | B2 | C1 | Penetration | penetration | X | 99 | 2.4 |
| 42 | A21 | B2 | C1 | Clad could not be formed due to occurrence of cracks | | — | — | — |
| 43 | A22 | B2 | C1 | Penetration | 64 | ○ | 35 | 0.8 |
| 44 | A23 | B23 | C1 | Penetration | Penetration | X | 96 | 2.3 |
| 45 | A24 | B24 | C1 | Penetration | Penetration | X | 97 | 2.5 |
| 46 | A2 | B2 | C2 | 55 | Penetration | ○ | 98 | 2.4 |
| Conventional example | | | | | | | | |
| 47 | A2 single layer | | C1 | Penetration | Penetration | X | 100 | 2.6 |
| 48 | B2 single layer | | C1 | Penetration | Penetration | X | 100 | 2.5 |
| 49 | JIS-3003 layer | | C1 | Penetration | Penetration | X | 100 | 2.5 |

As is apparent from Table 2, the maximum pitting depth in each sample Nos. 1 to 33 according to the present invention was 70 μm or less at both the atmosphere side and the refrigerant side, showing excellent corrosion resistance. Brazing ability was also excellent since the ratio of successful welding of the fin in each of these samples was 95% or more. The position to be noblest in corrosion potential in the direction of thickness of the sheet was evaluated as good (○) or poor (x) in the table when such a noblest (peak) position was at the sacrificial anode material side or filler alloy side, respectively, from the center of thickness of the sheet.

The ratio of successful welding with the fin was 95% or more, showing excellent brazing ability. The throat thickness at the sacrificial anode material side was 2.3 mm or more, also showing excellent brazing ability.

Contrary to the above, in the samples (Nos. 34 to 45) in the comparative examples having alloy compositions out of the definition in the present invention, the sample (No. 46) in the comparative example having constructions out of the definition in the present invention, and the samples in the conventional examples (Nos. 47 to 49), penetration holes were occurred at either the atmosphere side or refrigerant side, or the intermediate layer was melt at the time of brazing or cracks were occurred during the rolling process to unable production of a brazing sheet.

Corrosion resistance at the refrigerant side was poor in the sample of the comparative example No. 34, due to precipitation of simple substance Si, since the intermediate layer contained a too large amount of Si. The self corrosion resistance of the intermediate layer was poor to occur penetration holes at the refrigerant side in the sample of the comparative example No. 35 since the intermediate layer contained a too large amount of Fe.

The intermediate layer was melted by heating for brazing in the sample in the comparative example No. 36 because the intermediate layer contained a too large amount of Cu, thereby making it impossible to produce and evaluate a brazing sheet.

Cracks were occurred in the rolling process in the comparative example No. 37 because the intermediate layer contained a too large amount of Mn, thereby making it impossible to manufacture the brazing sheet.

Brazing ability at the sacrificial anode material side was poor in the sample in the comparative example No. 38 because the intermediate layer contained a too large amount of Mg.

Si simple substance was precipitated and corrosion resistance at the refrigerant side was poor in the sample in the comparative example No. 39 since the core alloy contained a too large amount of Si.

Self corrosion resistance of the core alloy was poor and corrosion resistance at the atmosphere side was poor in the sample in the comparative example No. 40, since the core alloy contained a too large amount of Fe.

The difference in the electric potential between the core alloy and intermediate layer become small due to diffusion of the elements by heating for brazing in the sample in the comparative example No. 41, because the core alloy contained a too large amount of Cu. Consequently, the portion noblest in electric potential was located at the filler alloy side in the direction of thickness of the sheet, and corrosion resistance at the refrigerant side was poor.

Cracks were occurred during the rolling process in the sample in the comparative example No. 42 because the core alloy contained a too large amount of Mn, making it impossible to manufacture a brazing sheet.

Brazing ability of the fin was poor to fail in obtaining corrosion preventive effect to the fin in the sample in the comparative example No. 43 because the core alloy contained a too large amount of Mg, thereby corrosion resistance at the atmosphere side was poor (the comparative example to the third invention).

The portion noblest in electric potential was located at the filler alloy side in the direction of thickness of the sheet in the sample in the comparative example No. 44 because the proportion of the intermediate layer was too large, thereby corrosion resistance was poor (the comparative example to the fifth invention).

The difference in electric potential in the direction of thickness of the sheet after brazing become small due to a too small proportion of the intermediate layer in the sample in the comparative example No. 45, thereby corrosion resistance was poor (the comparative example to the fifth invention).

The brazing sheet could not be prevented from corrosion due to a too small content of Zn in the sacrificial anode material in the sample in the comparative example No. 46 (the comparative example to the sixth invention).

The samples in the conventional examples had a single layer of the core alloy. Consequently, the portion noblest in electric potential was located at the filler alloy side in the direction of thickness of the sheet, thereby corrosion resistance was poor.

As described in the above, the aluminum alloy brazing sheet of the present invention is excellent in corrosion resistance, exhibiting an industrially remarkable effect as the aluminum alloy brazing sheet for use in heat exchangers.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An aluminum alloy brazing sheet having a four-layered structure, of sheet thickness 0.2 mm or less, and comprising a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, and 0.05 to 0.5 wt % of Cu, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, and 0.4 to 1 wt % of Cu, with the balance being made of Al and unavoidable impurities.

2. The aluminum alloy brazing sheet according to claim 1, wherein either the core alloy or the intermediate layer, or both of them, comprises at least one of Cr, Zr and Ti each in an amount of 0.3 wt % or less.

3. The aluminum alloy brazing sheet according to claim 1, wherein the ratio of thickness of the core alloy and the intermediate layer is in the range of 1≦the core alloy/the intermediate layer≦3.

4. The aluminum alloy brazing sheet according to claim 1, wherein the sacrificial anode material is composed of the Al—Zn alloy comprising 2 to 6 wt % of Zn, with the balance being made of Al and unavoidable impurities.

5. The aluminum alloy brazing sheet according to claim 1, wherein the content of Cu in the core alloy is 80% or less to the Cu content in the intermediate layer.

6. An aluminum alloy brazing sheet having a four-layered structure, of sheet thickness 0.2 mm or less, and comprising a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, and 0.05 to 0.5 wt % of Cu, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, 0.4 to 1 wt % of Cu, and 0.2 to 1.5 wt % of Mg, with the balance being made of Al and unavoidable impurities.

7. The aluminum alloy brazing sheet according to claim 6, wherein either the core alloy or the intermediate layer, or both of them, comprises at least one of Cr, Zr and Ti each in an amount of 0.3 wt % or less.

8. The aluminum alloy brazing sheet according to claim 6, wherein the ratio of thickness of the core alloy and the intermediate layer is in the range of 1≦the core alloy/the intermediate layer≦3.

9. The aluminum alloy brazing sheet according to claim 6, wherein the sacrificial anode material is composed of the Al—Zn alloy comprising 2 to 6 wt % of Zn, with the balance being made of Al and unavoidable impurities.

10. The aluminum alloy brazing sheet according to claim 6, wherein the content of Cu in the core alloy is 80% or less to the Cu content in the intermediate layer.

11. An aluminum alloy brazing sheet having a four-layered structure, of sheet thickness 0.2 mm or less, and comprising a core alloy, a filler alloy composed of an Al—Si alloy on one surface of the core alloy, a sacrificial anode material composed of an Al—Zn alloy on the other surface of the core alloy, and an intermediate layer between the core alloy and the sacrificial anode material, wherein the core alloy is composed of an Al alloy comprising 0.1 to 0.5 wt % of Si, 0.2 to 0.8 wt % of Fe, 0.5 to 2.0 wt % of Mn, 0.05 to 0.5 wt % of Cu, and 0.05 to 0.2 wt % of Mg, with the balance being made of Al and unavoidable impurities, and wherein the intermediate layer is composed of an Al alloy comprising 0.1 to 0.5 wt % of Si, 0.2 to 0.8 wt % of Fe, 0.5 to 2.0 wt % of Mn, 0.4 to 1 wt % of Cu, and 0.2 to 1.5 wt % of Mg, with the balance being made of Al and unavoidable impurities.

12. The aluminum alloy brazing sheet according to claim 11, wherein either the core alloy or the intermediate layer, or both of them, comprises at least one of Cr, Zr and Ti each in an amount of 0.3 wt % or less.

13. The aluminum alloy brazing sheet according to claim 11, wherein the ratio of thickness of the core alloy and the intermediate layer is in the range of 1≦the core alloy/the intermediate layer≦3.

14. The aluminum alloy brazing sheet according to claim 11, wherein the sacrificial anode material is composed of the Al—Zn alloy comprising 2 to 6 wt % of Zn, with the balance being made of Al and unavoidable impurities.

15. The aluminum alloy brazing sheet according to claim 11, wherein the content of Cu in the core alloy is 80% or less to the Cu content in the intermediate layer.

16. The aluminum alloy brazing sheet according to claim 11, wherein the content of Mg in the core alloy is smaller than the content of Mg in the intermediate layer.

* * * * *